United States Patent
Krieve

[15] 3,636,720
[45] Jan. 25, 1972

[54] PHASE SEPARATOR

[72] Inventor: Walter F. Krieve, Palos Verdes Peninsula, Calif.
[73] Assignee: TRW, Inc., Redondo Beach, Calif.
[22] Filed: Apr. 30, 1969
[21] Appl. No.: 820,589

[52] U.S. Cl. ....................................................62/49, 62/52
[51] Int. Cl. ..............................................................F17c 9/02
[58] Field of Search ..........................................62/52, 53, 49

[56] References Cited

UNITED STATES PATENTS

| | | | |
|---|---|---|---|
| 3,054,270 | 9/1962 | Huston | 62/52 |
| 3,199,303 | 8/1965 | Haumann et al. | 62/52 X |
| 1,930,731 | 10/1933 | Thompson | 62/53 |
| 2,532,710 | 12/1950 | Goddard | 62/53 X |
| 2,968,163 | 1/1961 | Beckman | 62/51 |
| 2,996,893 | 8/1961 | Goodenough et al. | 62/52 |
| 3,174,294 | 3/1965 | Lawrence | 62/52 X |

FOREIGN PATENTS OR APPLICATIONS 1,145,198   3/1963   Germany....................................62/52

*Primary Examiner*—Albert W. Davis, Jr.
*Attorney*—Daniel T. Anderson, Donald W. Graves and William B. Leach

[57] ABSTRACT

A fluid phase separator is provided which controls the mass flow rate of a fluid being expelled from a tank and insures that the fluid is in a vapor phase. A control valve is attached to the tank. Connected to the control valve is a flow tube which is sized such that the mass flow rate of the fluid passing through the tube is substantially independent of the phase of the fluid entering. The tube is designed to have flow characteristics and sufficient heat transfer area such that the fluid exiting is in a vapor phase. A ballast chamber is connected to the flow tube. The chamber delivers vapor from the flow tube and damps the effects of pressure response in the fluid. A pressure sensor is placed at the downstream end of the ballast tube for control of the valve. The fluid phase separator is applicable for use as a feed system in a low or zero-gravity field which uses a fluid having an appreciable vapor pressure when stored as a liquid such as ammonia, oxygen, or hydrogen.

1 Claims, 1 Drawing Figure

PATENTED JAN 25 1972
3,636,720
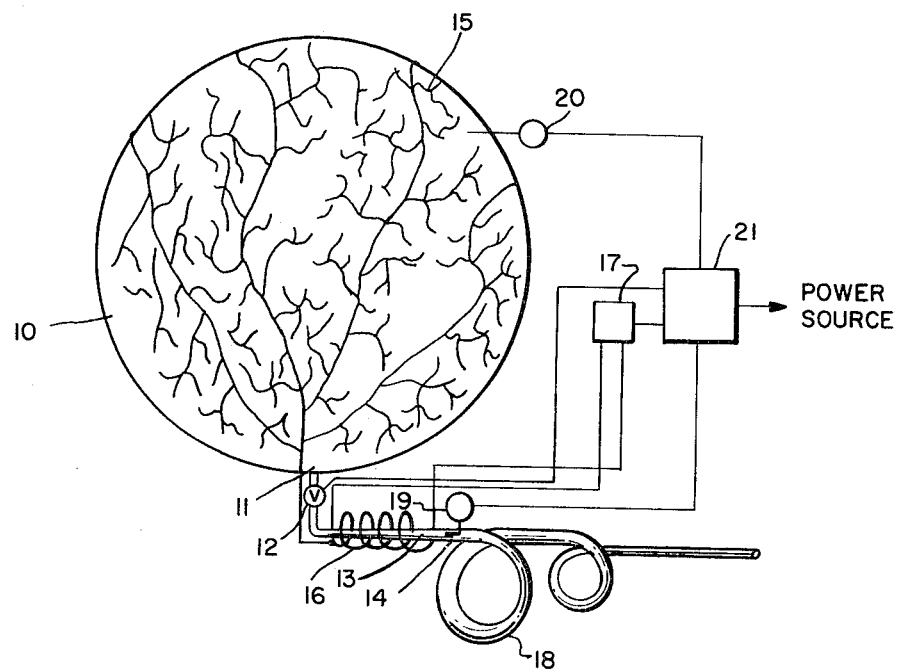
Walter F. Krieve
INVENTOR.
BY Frank Wattles
ATTORNEY

3,636,720

PHASE SEPARATOR

BACKGROUND OF THE INVENTION

1. Field of the Invention

The fluid phase separator is within the field of fluid flow devices having flow induced by a pressure differential and, more particularly, within the field of fluid feed systems utilizing single-phase and two-phase flow of a vapor or liquid-vapor, respectively.

2. Description of the Prior Art

Conventional art devices provide fluid-flow-rate control or means to induce a flow of fluid. Conventional systems employ bladders to induce and control flow, screens for flow control, or dielectrophoresis to induce and control flow.

The liquid-vapor interface in a fluid storage tank in a low- or zero-gravity field can not be predicted if random force perturbations or temperature variations are experienced. When fluid is withdrawn from the tank it may be vapor, liquid or a two-phase mixture. Variations in propellant phase or mass flow rate are undesirable for applications, such as rocket propulsion, because of phase variation influence on performance characteristics. To be useful, therefore, the fluid must exist in a vapor phase.

Conventional systems require that the downstream recipient operation be specifically designed to insure a conversion of the fluid to a gas phase. These systems require elaborate heat transfer and pressure regulating devices.

The fluid phase separator uses a flow tube or flow tubes for controlling the flow rate and converting the fluid to a vapor phase thereby eliminating the need for a downstream operation to convert the fluid to a vapor. The flow tube of the fluid phase separator is designed such that elaborate heat transfer pressure regulating devices and downstream operation are not required. The fluid phase separator is, therefore, less complex and more reliable and potentially lighter in weight than conventional feed systems.

SUMMARY OF THE INVENTION

Briefly, this invention provides a device for controlling the mass flow rate of a fluid delivering fluid to external equipment in a vapor phase. The device comprises a tank which has a discharge port for supplying the fluid. A valve is mounted on the tank covering the discharge port and is used for controlling the discharge of fluid from the tank. At least one flow tube has an entrance and attached to the valve. The flow tube has passage dimensions such that the mass flow rate of the fluid passing through the flow tube is substantially independent of the phase of the fluid entering the tube and the fluid exiting is in a vapor phase.

BRIEF DESCRIPTION OF THE DRAWINGS

The FIGURE is a schematic representation of one embodiment of the invention.

DESCRIPTION OF THE PREFERRED EMBODIMENT

The liquid-vapor interface in a storage tank in a low- or zero-gravity field can not be predicted if random force perturbations or temperature variations are experienced. The fluid that is withdrawn from the storage tank can exist either in a vapor phase, liquid phase, or a two-phase mixture. The term phase as used herein refers to the state of the fluid, that is, if the fluid is a liquid the fluid is said to exist in a liquid phase, if the fluid is a gas or a vapor the fluid exists in a vapor phase and a liquid-vapor phase occurs when the fluid exists as a mixture of liquid and vapor such as when the fluid is boiling. The fluid phase separator is applicable for use as a feed system in a low-gravity or zero-gravity field but not limited to such use. The fluid phase separator is applicable to fluids which have appreciable vapor pressures when stored as a liquid. Ammonia, oxygen, or hydrogen are illustrations of liquids having the required vapor pressures.

Referring now to the drawing. There is illustrated an embodiment of the liquid phase separator. The separator includes tank 10 which is used to store a fluid either in a liquid phase, vapor phase, or a liquid vapor phase. Structurally, tank 10 must be a pressure vessel since the fluid within the tank 10 is stored at a pressure above that pressure surrounding tank 10. The preferred shape of tank 10 is spherical but could be cylindrical with hemispherical ends or any other shape that could withstand a pressure differential between the internal and external pressure. Tank 10 has a discharge port 11. A valve 12 is attached to tank 10 covering discharge port 11. Valve 12 is normally closed to prevent fluid escape from tank 10. Fluid is discharged from tank 10 when valve 12 is opened. The material of which valve 12 is made must be compatible with the fluid which is to pass through valve 12; that is, the valve material must be such that no chemical or physical reactions between the valve material and the fluid take place. The construction of valve 12 must be such as to permit operation of valve 12 during all variations of fluid temperature, pressure, phase, and ambient temperature and pressure.

A flow tube 13 is connected to valve 12. The passage of tube 13 has dimensions such that the flow rate of the fluid entering tube 13 from tank 10 through valve 12 is substantially independent of the phase of the fluid and the fluid exiting at 14 is in a vapor phase. In manufacture, the specific tube dimensions have been derived by the following procedure. A certain test fluid is passed through a flow tube of the approximate desired dimensions. The test fluid exists in liquid phase in some passes and in vapor phase during other passes. A pressure versus mass flow rate chart of the two phases of the test fluid is plotted. The vapor phase and liquid phase curves intersect at a point where each phase has the same mass flow rate at a certain pressure. After determining the pressure ($P_1$) for which the mass flow rates of liquid phase and vapor phase of a certain fluid are equal, the pressure difference ($P_2-P_1$) which will produce complete vaporization of the fluid is determined. Vaporization is caused by heat being transferred to the fluid from the environment. Complete vaporization exists when sufficient heat is transferred to the fluid at the temperature and pressure of flow to change the phase of the fluid to vapor. The quantity of heat necessary to vaporize a fluid is predetermined and available on many tables. The quantity of heat actually transferred to the fluid is partially dependent upon the surface area of the passage of the tube. Also, the pressure difference ($P_2-P_1$) which will produce complete vaporization for a given mass flow rate is partially dependent upon the ratio of the tube length to the tube diameter. Therefore, by selecting the length and diameter of the tube in accordance with the required pressure difference and heat transfer, complete vaporization can be assured for a given ambient temperature. Thus, the length and diameter of tube 13 are set. For example, experience has shown that a tube size of 0.008 inch inside diameter and length of 17.5 inches was satisfactory where the fluid was ammonia and a mass flow rate of 0.1 pounds per hour was produced by a pressure of 60 p.s.i.a. at the tube exit 14 and the pressure of the fluid within tank 10 was 170 p.s.i.a.

In the event the ambient temperature does not supply adequate heat to tube 13 to avoid in the design unmanageably large dimensions of tube 13, optionally there is provided a heat transfer filament mesh 15. The mesh 15 is attached to and covers tank 10. A heater coil 16 may be provided enveloping tube 13 to provide further heat directly to the fluid flow. Mesh 15 and coil 16 each have connections adapted to connect to a source of power and each may be but are not limited to an electrical resistive type heater, with possible conductive fins or filaments extending therefrom. In the drawing mesh 15 and coil 16 are illustrated as serially connected with a control means 17. The control means 17 may be a thermostatic control or other control means for applying power to mesh 15 and coil 16 at appropriate times.

A ballast chamber 18 is attached to tube 13 at exit end 14. Chamber 18 accommodates the vapor resulting from the residual fluid in tube 13 after valve shut off and passes the vapor when valve 12 is open. Chamber 18 may be a tank, a single tube or a plurality of tubes. The size of chamber 18 depends on the pressure change tolerable at its outlet.

A first pressure sensor 19 is located at or near the outlet of tube 13 for measuring pressure at that point. A second pressure sensor 20 is located within tank 10 for measuring tank pressure. A master control means 21 for controlling the operation of valve 12 and control means 17 is operationally connected to sensors 19 and 20, to valve 12, and to control means 17. The master control means 21 will open valve 12 when the pressure at sensor 19 falls below a certain value in order to increase that pressure. Also, means 21 will activate the control means 17 when the pressure at sensor 20 reaches a certain minimum value to heat the tank 10 and tube 13 and to vaporize the fluid, thereby increasing the tank pressure and pressure difference ($P_2-P_1$). It will be appreciated that the control means 21 will not operate heat control means 17 when the latter optional equipment is omitted.

In operation, the heat control means 17 and mesh 15 automatically control tank temperature (and pressure) at a desired level. The normally closed valve 12 is programmed to automatically open when the downstream pressure near sensor 19 drops to a specified value. Sensor 19 provides the appropriate signal to the control means 21 which causes valve 12 to open. By virtue of the pressure differential between tank 10 and chamber outlet at sensor 19, fluid will enter the valve 12 and flow through tube 13 and chamber 18. When the pressure of the system being supplied through the chamber outlet rises above a certain level the sensor 19 will stop providing a signal to the means 21 and valve 12 will close.

During the time that flow is occuring, either vapor, liquid or a combination of vapor and liquid may enter through valve 12. With liquid entering, tube 13 will act as a heat exchanger, extracting energy from the fluid in the tank 10 and from mesh 15 and coil 16 to vaporize the flowing fluid. The tube 13 is designed, as mentioned hereinabove, so that the mass flow rate will be very close to that of single phase vapor flow. If a two phase mixture enters the phase separator, the mass flow rate is also similar to that of the single phase vapor. The ballast chamber 18 damps the effects of dynamic pressure response in the fluid.

While certain embodiments of the invention have been described in detail herein and shown in the accompanying drawing, it will be evident that various additional modifications are possible in the arrangement and construction of its components without departing from the scope of the invention.

I claim:

1. A device to control the mass flow rate of a fluid to insure that said fluid is delivered to external equipment which comprises:

a tank having a discharge port and a valve for opening and closing said discharge port;

a flow tube connected to said valve, said flow tube having passaged dimensions such that the mass flow rate of the fluid when passing through said flow tube is substantially independent of the phase of the fluid entering the tube and the fluid exiting the tube is in a vapor phase;

a first pressure sensor located near the outlet of said flow tube;

a second pressure sensor to measure the pressure of the fluid in said tank;

a master control means operatively connected to said first and second pressure sensors;

means to heat said tank and said flow tube, said heating means being controlled by said master control means, said master control means being adapted to open said port valve means when the pressure in said flow tube as sensed by said first pressure sensor drops below a predetermined value, said master control means further being adapted to turn on said heat source in response to pressure dropping below a preselected value as sensed by said second pressure sensor whereby to heat said tank and said flow tube; and a ballast chamber having an inlet connected to said flow tube, said ballast chamber connected to said flow tube and adapted to collect residual vapor and to pass said vapor during discharge of the fluid from the tank and flow tube and to dampen the effects of poor dynamic response in said fluid.

* * * * *

UNITED STATES PATENT OFFICE
CERTIFICATE OF CORRECTION

Patent No. 3,636,720      Dated January 25, 1972

Inventor(s) Walter F. Krieve

It is certified that error appears in the above-identified patent and that said Letters Patent are hereby corrected as shown below:

The term of this patent subsequent to

Jan. 25, 1989, has been disclaimed.

Signed and sealed this 15th day of April 1975.

(SEAL)
Attest:

RUTH C. MASON
Attesting Officer

C. MARSHALL DANN
Commissioner of Patents
and Trademarks